United States Patent [19]

Laar et al.

[11] 4,134,663

[45] Jan. 16, 1979

[54] METHOD AND APPARATUS FOR FEEDING REPLENISHMENT CHEMICALS IN FILM PROCESSORS

[75] Inventors: Erwin Laar, Taufkirchen; Friedrich Ganser, Feldkirchen-W., Fed. Rep. of Germany

[73] Assignee: AGFA-Gevaert AG, Fed. Rep. of Germany

[21] Appl. No.: 751,487

[22] Filed: Dec. 16, 1976

[30] Foreign Application Priority Data

Dec. 19, 1975 [DE] Fed. Rep. of Germany ....... 2557253

[51] Int. Cl.$^2$ .............................................. G03D 3/06
[52] U.S. Cl. .................................. 354/298; 354/321; 354/324
[58] Field of Search ............... 354/297, 298, 319, 320, 354/321, 322, 324; 250/571

[56] References Cited

U.S. PATENT DOCUMENTS

| 3,090,290 | 5/1963 | Ross | 354/298 |
|---|---|---|---|
| 3,366,025 | 1/1968 | Layne | 354/322 |
| 3,472,143 | 10/1969 | Hixon et al. | 354/298 |
| 3,787,689 | 1/1974 | Fidelman | 354/298 |
| 3,905,698 | 9/1975 | Schroter et al. | 354/298 |
| 3,913,119 | 10/1975 | Pfeifer et al. | 354/298 |
| 3,978,506 | 8/1976 | Geyken et al. | 354/324 |
| 3,990,088 | 11/1976 | Takita | 354/324 |

*Primary Examiner*—L. T. Hix
*Assistant Examiner*—Alan Mathews
*Attorney, Agent, or Firm*—Peter K. Kontler

[57] ABSTRACT

A photographic processor wherein parallel webs consisting of photosensitive material and/or other material and having identical or different widths are transported lengthwise through one or more liquid baths each of which receives identical quantities of replenishment chemicals at a frequency which insures that the activity of the baths remains unchanged. The device which feeds replenishment chemicals is controlled by a circuit having two inputs one of which receives first signals at a frequency corresponding to the rate of transport of unit lengths of the webs through the bath or baths and the other of which receives cyclically second signals, one for each photosensitive web and each persisting for a period of time which is proportional to the width of the respective photosensitive web. The control circuit causes the feeding device to admit a predetermined quantity of replenishment chemicals in response to the generation of each first signal during the persistence of a second signal. First signals are generated on closing of a microswitch which is actuated by a loop former associated with one of the webs and moving up and down at a frequency which is proportional to the speed of the corresponding web. Second signals are generated by a photoelectric cell which is moved at a constant speed back and forth transversely of the paths of webs and whose transducer reacts only to light which is reflected by a photosensitive web.

15 Claims, 4 Drawing Figures

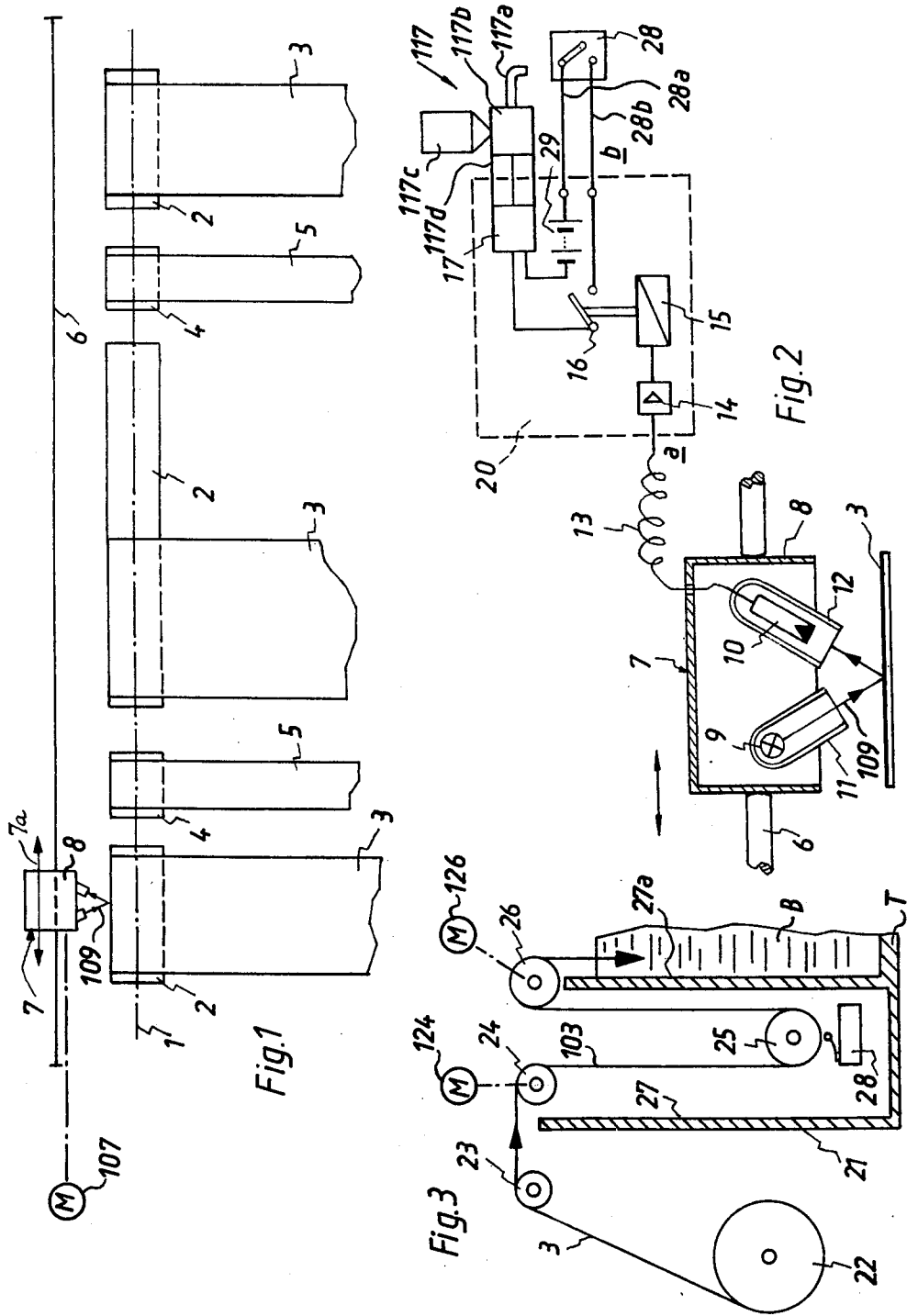

METHOD AND APPARATUS FOR FEEDING REPLENISHMENT CHEMICALS IN FILM PROCESSORS

BACKGROUND OF THE INVENTION

The present invention relates to a method and apparatus for feeding replenishment chemicals in photographic film or paper processors. More particularly, the invention relates to improvements in a method and apparatus for feeding replenishment chemicals in processors wherein webs or strips of exposed photographic film or photographic paper are transported through one or more liquid baths and wherein the speed, width and/or number of transported photosensitive webs varies at regular or irregular intervals and within a narrow or wide range.

Webs of photographic film or photographic paper are treated in developing machines wherein they pass through one or more vessels or tanks containing different liquids, such as a developing bath, a fixing bath and a rinsing bath. In order to compensate for loss in activity, it is necessary to supply the baths with replenishment chemicals, either continuously or intermittently. The chemicals (this term is intended to embrace developing agents, fixing agents as well as any other agents, including water, which are held in storage for admission to the respective baths by resorting to replenishment pumps or other feeding units) should be admitted in dependency on the quantity of material which has passed through the respective tank per unit of time, i.e., in proportion to the surface area of the treated photosensitive material. In certain presently known developing machines wherein one or more webs of photographic film or paper are transported through successive tanks along discrete paths, each path is monitored by a microswitch which transmits or causes the transmission of signals whose intensity or another characteristic is indicative of the quantity of conveyed material. The signals are transmitted to an electric impulse generator which actuates the respective feeding unit whenever the intensity and/or number of signals indicates that the corresponding tank must receive a supply of replenishment chemicals. In most instances, each feeding involves the admission of a predetermined quantity of replenishment chemicals.

The just discussed feeding apparatus exhibit a number of drawbacks, especially as regards the accuracy of maintaining the level of activity of one or more baths within a rather narrow range. This is due to the fact that the conventional apparatus do not take into consideration all factors which influence the activity of the bath or baths. Such factors include the speed of transport of film and/or paper, the width of webs and/or others. On the other hand, it is highly desirable to construct and assemble a developing machine in such a way that it can simultaneously process two or more webs of photographic film or paper, to shift from the processing of a single web to the processing of two or more webs (or vice versa), and/or to treat relatively narrow or relatively wide webs, either simultaneously or one after the other. If the presently known principles of monitoring the webs were applied in such machines, each machine would be equipped with a large number of monitoring devices and with rather complex evaluating circuitry for the signals which are furnished by the monitoring devices.

German Offenlegungsschrift No. 1,522,856 discloses a processor wherein a sensor is moved transversely of the path of a running web in order to determine the width of the transported material. It has been found that mere determination of width does not suffice to insure that the activity of each and every bath remains constant or nearly constant. This will be readily appreciated by considering that successive webs are normally attached to each other by strips consisting of a material which is not photosensitive. Such strips are also used to connect the ends of webs to the cores of supply and takeup reels. The mobile sensor which is disclosed in the German Offenlegungsschrift No. 1,522,856 cannot discriminate between photosensitive and other materials and, therefore, its ability to monitor the width of webs does not contribute significantly to satisfactory feeding of replenishment chemicals. Moreover, the just discussed apparatus does not have any film velocity sensor means for determining the exact length of those portions of webs which are transported through the bath or baths per unit of time.

OBJECTS AND SUMMARY OF THE INVENTION

An object of the invention is to provide a novel and improved method of feeding replenishment chemicals to one or more liquid baths in a photographic processor in such a way that the activity of each bath remains unchanged or fluctuates within a permissible range regardless of whether the processor treats one or more photosensitive webs of identical or different widths and/or whether or not the material which is transported through one or more baths includes photosensitive webs alone or photosensitive webs as well as webs or strips which are not sensitive to light and do not influence the activity of the baths.

Another object of the invention is to provide a method of the just outlined character which insures that a predetermined quantity of replenishment chemicals is added to each bath in response to completion of transport of a predetermined quantity of photosensitive web material through the respective bath, irrespective of the distribution of such photosensitive material as considered transversely of the direction of movement through the bath or baths.

A further object of the invention is to provide an apparatus which can be utilized for the practice of the above outlined method and is constructed and assembled in such a way that it can take into consideration all important factors which influence the activity of one or more baths in a photographic processor when such baths are to treat photosensitive webs of identical or different widths as well as when photosensitive webs of identical or different widths are transported simultaneously with other types of webs which do not influence the activity of the baths.

An additional object of the invention is to provide the apparatus with novel and improved means for monitoring the speed of webs which are transported through one or more liquid baths in a photographic processor, particularly through one or more baths of a developing machine for exposed photographic films or papers.

A further object of the invention is to provide the apparatus with novel and improved means for monitoring the width of webs which are transported through one or more liquid baths in a photographic processor.

An ancillary object of the invention is to provide the apparatus with novel and improved means for controlling the operation of one or more devices or units which feed replenishment chemicals to one or more liquid baths in a photographic processor.

One feature of the invention resides in the provision of a method of feeding replenishment chemicals to a liquid bath (e.g., a developing solution) in a photographic processor wherein webs of identical or different widths are transported through the bath lengthwise at a variable speed and such webs include at least one photosensitive web (e.g., a web of spliced-together photographic films or a web of photographic paper). The method comprises a first step of generating first signals (preferably electric signals) at a frequency corresponding to the rate of transport of successive unit lengths of the webs through the bath (this is tantamount to generation of signals at a frequency which is proportional to the velocity of the webs), a second step of generating at regular intervals second signals whose number is identical with the number of photosensitive webs and each of which persists or lasts for a period of time proportional to the width of the respective photosensitive web, and a third step of feeding replenishment chemicals (preferably predetermined quantities of such chemicals) to the liquid bath in response to each generation of a first signal during the persistence or existence of a second signal.

The first step may comprise storing a portion of a web (which may but need not be photosensitive) ahead of the liquid bath, changing the length of the stored portion at a frequency which varies proportionally with changes in the speed of the respective web through the liquid bath, and generating the first signals at the last mentioned frequency.

The second step may include moving a detector (e.g., a photoelectric cell which includes a source of infrared light) cyclically transversely of all of the paths, i.e., transversely of the path or paths for photosensitive web(s) and transversely of the path or paths for one or more webs or strips which do not consist of or do not include photosensitive material. It is preferred to make such strips of a material whose light-reflectivity is different from (preferably substantially less than) the light-reflectivity of photosensitive webs. This enables the transducer of the aforementioned photoelectric cell to discriminate between photosensitive and other webs.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an elevational view of a portion of the improved apparatus, showing the detector of the means for generating second signals;

FIG. 2 is an enlarged sectional view of the detector and a diagrammatic view of the feeding device for replenishment chemicals, of control means for the feeding device, and of a portion of the means for generating first signals;

FIG. 3 is a schematic fragmentary sectional view of the photographic processor which embodies the improved apparatus, showing a tank for a liquid bath and the entire means for generating first signals.

DESCRIPTION OF THE PREFERRED EMBODIMENTS

Figure 4:
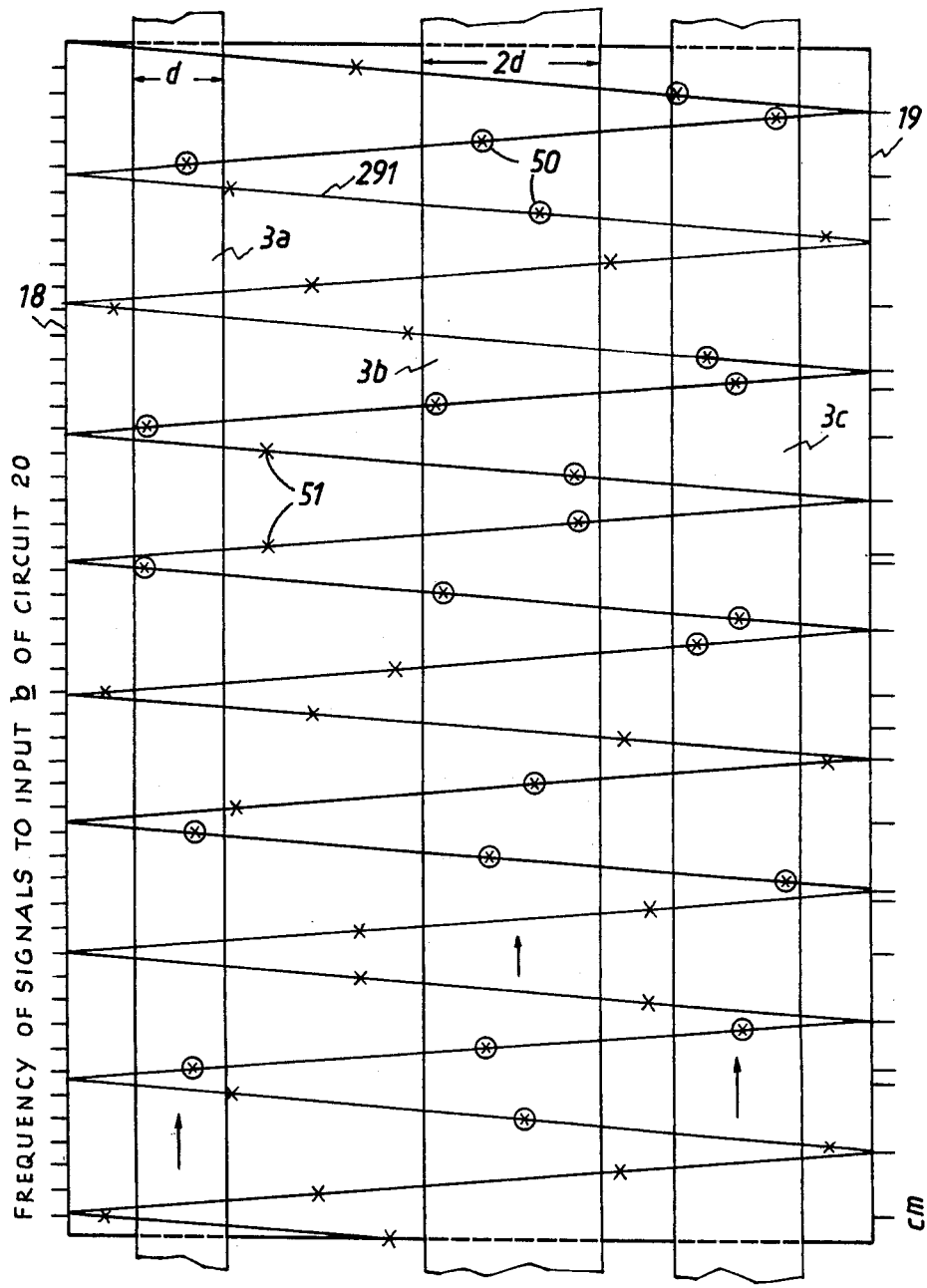
FIG. 4 is a diagram showing the relationship between the speed and width of photosensitive webs on the one hand and the frequency at which the feeding device is operated on the other hand.

Referring first to FIG. 1, there is shown a portion of an apparatus which embodies the invention. The apparatus comprises a shaft 6 or an analogous combined support and guide for a signal generating detector 7 which is movable therealong in directions indicated by double-headed arrow 7a transversely of the paths of several parallel webs 3 and 5. The guide rolls 2 and 4 for the webs 3 and 5 are mounted on a second shaft 1 which is parallel to the support 6. The webs 3 consist of or include photosensitive material (e.g., each web 3 may consist of photographic paper), and the webs 5 constitute the aforementioned strips made of a material which is not sensitive or less sensitive to light. The means for moving the detector 7 cyclically at regular intervals back and forth along the support 6 includes a suitable reversible motor 107 the exact construction of which forms no part of the invention. The length of the support 6 suffices to insure that the detector 7 can move transversely of each and every path, i.e., from the outer side of the path for the leftmost web 3 to the outer side of the path for the rightmost web 3, and vice versa.

The construction of the detector 7 is shown in FIG. 2. This detector is a photoelectric cell which comprises a receptacle or box 8 containing a light source 9 and a photosensitive transducer 10. The motor 107 moves the box 8 back and forth along the support 6. The source 9 is installed in an opaque housing 11 which is open at one end, namely, at that end which faces the paths for the webs 3 and 5 in the region of the rolls 2 and 4. A similar opaque housing 12 is provided for the transducer 10. The light beam 109 which issues from the source 9 and passes through the open end of the housing 11 impinges upon the adjacent web 3 or 5 and is reflected through the open end of the housing 12 and against the photosensitive surface of the transducer 10. The source 9 preferably emits infrared light, i.e., light whose wave length is within a range in which the photosensitive layers of the transported webs 3 are not sensitive. The transducer 10 is sensitive to light of the aforementioned wave length. Moreover, the sensitivity of the transducer 10 is selected in such a way that it reacts only to light which is reflected by the webs 3 but not to light (of lesser intensity) which is reflected by the strips 5.

A flexible conductor 13 connects the output of the transducer 10 with the corresponding input a of a control circuit 20 which has another input b for reception of signals at a frequency corresponding to the rate of transport of successive unit lengths of the webs 3 and 5 through the photographic processor. The means for transmitting signals to the input b may be of any known design, e.g., an optical monitoring device, a tachometer generator or the like. In the illustrated embodiment, the means for monitoring the speed of webs 3 and 5 by monitoring the frequency at which successive unit lengths of a web 3 move past a portion of the respective path includes an arrangement which is shown in FIG. 3 and includes a web storing or looping device mounted immediately ahead of a vessel or tank T for a liquid bath B. The reference character 21 denotes the casing or frame of the photographic processor, and this casing defines a compartment or chamber 27 immediately ahead of the tank T. The latter may form part of or it may be detachably secured to the casing 21. A supply of web 3 is stored on a reel 22, and the web is guided by rolls 23, 24 and 26 each of which is rotatable about a fixed axis. The roll 23 is located to the left of the casing 21, the roll 24 is located above the compartment 27, and the roll 26 is located at a level above a partition 27a between the compartment 27 and the tank T. The web 3 is transported in the direction indicated by arrow and is trained over a looping roll or dancer roll 25 which is disposed in the compartment 27 between the rolls 24 and 26. The roll 23 is driven by a first prime mover 124. The looping of web 3 in the compartment 27 (the loop or supply of web 3 is shown at 103) is desirable in order to facilitate the splicing of successive webs 3 to each other and/or for other purposes. The compartment 27 does not store any liquid. The roll 26 is driven by a second prime mover 126. The prime mover 126 is on at all times, i.e., the roll 26 advances the web 3 continuously and normally at a constant speed. On the other hand, the prime mover 124 is designed to drive the roll 24 alternately at zero speed (or at a speed less than v) and at a speed $v + \Delta v$ wherein v is the peripheral speed of the roll 26. The prime mover 126 preferably further serves to drive additional guide rolls (not shown) which are installed downstream of the roll 26, as considered in the direction of movement of the web 3 through the photographic processor.

When the speed of the roll 24 is zero (or less than the speed of the roll 26), the dancer roll 25 in the bight of the loop 103 rises and the length of the loop 103 decreases. When the speed of the roll 24 exceeds the speed of the roll 26, the dancer roll 25 descends and the length of the loop 103 increases. For example, the value of $\Delta v$ may equal v, i.e., when the roll 24 is driven, its peripheral speed is twice the peripheral speed of the continuously driven roll 26. Such ratio of speeds is not very satisfactory because it entails repeated rapid acceleration of the supply reel 22 with the likelihood that the reel 22 will continue to pay out the web 3 when the speed of the roll 24 is zero. It is preferred, at this time, to select the speed of the intermittently driven roll 24 in such a way that $\Delta v$ equals a fraction of v, e.g., 0.3v.

The prime movers 124 and 126 are active at all times, i.e., as long as one or more webs 3 and 5 travel through the processor. Therefore, the frequency at which the size of the loop 103 increases or decreases can be used as an indication of the velocity of webs and of the frequency at which unit lengths of the web 3 advance past the roll 26 and through the bath B. The frequency of changes in the size of the loop 103 changes proportionally with changes in velocity of the webs. It should be borne in mind that the prime mover 126 may constitute a variable-speed prime mover so that the speed at which the webs 3 and 5 are transported through one or more tanks T can vary. The frequency at which the prime mover 124 drives and arrests the guide roll 24 is proportional to the speed of the prime mover 126. At any rate, and regardless of the exact nature of synchronization of the prime movers 124 and 126, the frequency at which the loop 103 changes its length is a very accurate indicator of the speed of lengthwise movement of the webs 3 and 5 through the tank or tanks T.

The length or speed monitoring means further comprises a detector here shwon as a microswitch 28 which is installed in the compartment 27 adjacent the path of up-and-down movement of the dancer roll 25 in the bight of the loop 103. In the embodiment which is shown in FIG. 3, the detector or switch 28 is installed at a level below the roll 25 so that it is actuated for a short period of time (which is constant) whenever the length of the loop 103 increases. However, it is equally possible to place the switch 28 above the path of the roll 25 so that the switch 28 is closed for a fixed period of time whenever the length of the loop 103 decreases. It is also possible to place the switch 28 adjacent the one or other side of the path for the roll 25. All that counts is to insure that each upward or downward movement of the dancer roll 25 entails one closing of the switch 28. When the latter is closed, it transmits a signal to the input b of the control circuit 20 (the movable contact of the switch 28 then assumes a position in which it establishes an electrical connection between the conductors 28a and 28b). The interval or period of time during which the switch 28 remains closed in response to each actuation by the dancer roll 25 is preferably adjustable so that such interval can be selected in dependency on the nature of the pump or other feeding unit 117 which is used to intermittently admit predetermined quantities of replenishment chemicals into the tank T.

The control circuit 20 of FIG. 2 further comprises an amplifier 14 which is connected between the output of the transducer 10 and a relay 15. The relay 15 controls a switch 16 which is closed in response to transmission of a signal from the tranducer 10 to the amplifier 14. The switch 16 is connected in series with the switch 28 of the velocity or length monitoring means, with a battery or another suitable source 29 of electrical energy, and with a means 17 for operating the feeding unit 117. The latter is of conventional design; it is preferably constructed and assembled in such a way that it admits to the tank T a predetermined quantity of replenishment chemicals whenever the switches 16 and 28 are closed simultaneously. The outlet of the feeding unit 117 is shown at 117a. This unit may comprise a plunger 117b which performs a suction stroke and forward stroke in response to simultaneous closing of switches 16, 28 whereby it draws a predetermined quantity of chemicals from a reservoir 117c into a cylinder 117d and expels such quantity via outlet 117a during its forward stroke.

The frequency at which the unit 117 feeds predetermined quantities of replenishment chemicals to the tank T increases with increasing speed of the webs 3 and 5.

The operation:

The means 107 for moving the detector 7 along the support 6 is preferably a synchronous tandem motor which drives the box 8 at a constant speed back and forth transversely of the paths for all of the running webs 3 and 5. During such movement of the detector 7, the output of the transducer 10 therein transmits signals at certain intervals, i.e., whenever and as long as its photosensitive surface receives light which is reflected by a web 3. The duration of each such signal is a function of the width of that web 3 which is then monitored by the detector 7. Thus, each signal which is transmitted to the input a of the control circuit 20 persists for a period of time which is proportional to the width of the respective web 3. When the switch 28 of the velocity or length monitoring means of FIG. 3 is closed while the delay 15 maintains the switch 16 in closed position (i.e., during the persistence of a signal from the transducer 10 to the input a of the control circuit 20), the operating means 17 causes the feeding unit 117 to discharge a predetermined quantity of replenishment chemicals into the respective tank T. The quantity of replenishment chemicals which are admitted into a tank T in response to each closing of the switch 28 (while the switch 16 is closed) can be selected with a view to correspond to a predetermined quantity (surface area) of the material of webs 3 which is transported through the tank T, i.e., independently of the speed at which the webs 3 are conveyed through the processor.

It will be seen that the frequency at which the feeding unit 117 admits chemicals to the respective tank T depends on the width of the webs 3 as well as the velocity at which the webs are transported through the tank or tanks. The operating means 17 receives an impulse whenever the switch 28 is closed simultaneously with the switch 16. In order to guarantee a satisfactory operation of the improved apparatus, it is desirable to insure that the closings of switch 28 during successive cycles of the detector 7 (each such cycle involves a movement of the detector 7 from one of its end positions to the other end position and back to the one end position) are staggered with respect to each other. In other words, one should insure that the timing of impulses which cause the operating means 17 to effect the admission of a metered quantity of replenishment chemicals is properly distributed in relation to the length of the path of movement of the detector 7 (i.e., in relation to the width of the composite path for the webs 3 and 5). This can be achieved in a number of ways, for example, by selecting the duration of intervals between successive closings of the switch 28 (such intervals are normally identical), the duration of intervals of successive cycles of the detector 7 and the duration of intervals of movement of the detector 7 between neighboring paths in such a way that the ratio of such intervals is not a whole number. Otherwise stated, if each cycle of the detector 7 takes up an interval P1, if each such interval P1 includes at least one interval P2 during which the detector 7 moves between the paths of two neighboring webs, and if the interval between successive closings of the switch 28 equals P3, the length of P1 and/or P2 is not a whole multiple of the length of P3.

FIG. 4 is a diagram which shows several successive cycles of movement (zig-zag line 291) of the detector 7 relative to the paths for the webs 3 (the webs or strips 5 can be disregarded because they do not cause the transmission of signals from the transducer 10 to the amplifier 14). The lines 18 and 19 respectively represent the left-hand and right-hand end positions of the detector 7. It is assumed that the distance between the lines 18 and 19 is 800 millimeters, that the duration of an interval P1 (complete cycle of the detector 7) is 234 seconds, and that the length of intervals P3 between successive closings of the switch 28 is 43 seconds. The circles 50 denote those closings of the switch 28 which cause the operating means 17 to effect the admission of a predetermined quantity of replenishment chemicals into the respective tank T, and the crosses 51 indicate those closings of the switch 28 which do not result in operation of the feeding unit (because the switch 28 is closed while the switch 16 is open). The detector 7 monitors three webs 3a, 3b and 3c. The width (2d) of the median web 3b is twice the width (d) of the left-hand web 3a. FIG. 4 shows that, during the period of time which equals the combined duration of nine successive cycles of the detector 7, the monitoring of web 3a has resulted in five operations of the feeding unit 117 and the monitoring of the wider web 3b has resulted in ten operations of the unit 117. In other words, and since the web 3b is wider than the web 3a, the monitoring of its width and speed resulted in a larger number of operations of the unit 117. The ratio of the number of operations caused by the web 3a to the number of operations caused by the web 3b is identical with the ratio of widths of the webs 3a and 3b.

The improved method and apparatus exhibit a number of important advantages. Thus, the monitoring of the velocity and width of photosensitive webs is effected in such a way that the detectors (28 and 7) need not come into contact with the material of the webs. Secondly, the reproducibility of operation of improved apparatus is extremely high because the apparatus operates by full consideration of those parameters (velocity and width of photosensitive webs) which are most important in connection with the feeding of replenishment chemicals in such a way that the activity of the respective bath or baths remains constant or fluctuates only within a permissible range. Moreover, the apparatus can be readily designed or adjusted to compensate for eventual variations of the speed at which the feeding unit 117 responds to a signal from the operating means 17. Still further, the apparatus need not be adjusted when the processor is to treat a larger or smaller number of photosensitive webs and/or webs of identical or different widths, i.e., the apparatus is always ready to actuate the feeding unit or units at the optimum frequency regardless of the number and/or width of the webs which are transported through the respective liquid bath or baths. Moreover, the presence or absence of one or more webs or strips which do not cause any (or which cause only negligible) changes in activity of liquid baths is of no consequence because the monitoring means which includes the detector 7 is capable of discriminating between photosensitive and other webs.

Another important advantage of the improved apparatus is that, even though simpler and less expensive, it is more versatile and more reliable than heretofore known apparatus. Thus, a single detector (7) suffices to monitor the widths of all photosensitive webs which are processed at the same time. This is in contrast to the design of those conventional apparatus wherein such monitoring necessitates the utilization of several discrete detectors or the use of a more complex detector. If the measurement of width is effected by resorting to several detectors, the outlay for electrical, electronic and/or other components of the evaluating circuitry which furnishes signals indicating the detected width of photosensitive bands is incomparably greater than in the improved apparatus. In addition, the disclosed means for monitoring the length of those portions of webs which pass through a liquid bath per unit of time is much simpler and more reliable than the length measuring devices (if any) of conventional apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of feeding replenishment chemicals to a liquid bath in a photographic processor wherein webs of identical or different widths are transported lengthwise through the bath at a variable speed and such webs include at least one photosensitive web, comprising a first step of generating first signals at a frequency corresponding to the rate of transport of successive unit lengths of the webs through said bath, said first step comprising storing a portion of a web ahead of said bath, changing the length of said stored portion at a frequency which varies proportionally with changes in the speed of transport of the respective web through said bath, and generating said first signals at said last mentioned frequency; a second step of generating at regular intervals second signals whose number is identical with the number of photosensitive webs and each of which persists for a period of time proportional to the width of the monitored photosensitive web and a third step of feeding replenishment chemicals to said bath in response to each generation of a first signal during the persistence of a second signal.

2. A method as defined in claim 1, wherein said third step includes feeding to said bath identical quantities of chemicals in response to each generation of a first signal during the persistence of a second signal.

3. Apparatus for feeding replenishment chemicals to a liquid bath in a photographic processor wherein webs of identical or different widths are transported through the bath lengthwise at a variable speed and such webs include at least one photosensitive web, comprising means for transporting the webs through said bath along discrete paths; means for monitoring the velocity of the web in one of said paths, including means for generating first signals at a frequency corresponding to the rate of transport of successive unit lengths of the web in said one path through said bath; means for monitoring all of said paths, including means for generating at regular intervals second signals, one for each photosensitive web and each persisting for a period of time which is proportional to the width of the monitored photosensitive web, said means for generating said second signals comprising a detector and said means for monitoring all of said paths further comprising means for moving said detector cyclically transversely of said paths, said detector having means for transmitting a second signal whenever and as long as said detector registers with a photosensitive web; means for intermittently feeding replenishment chemicals to said bath; and control means for actuating said feeding means in response to each generation of a first signal during the persistence of a second signal.

4. Apparatus as defined in claim 3, wherein said detector comprises a light source positioned to direct a light beam against said paths so that said beam is reflected by each web at least once during each cycle of said detector, and a photosensitive transducer positioned in the path of the reflected light beam and having an output arranged to transmit a second signal whenever and as long as said light beam is reflected by a photosensitive web.

5. Apparatus as defined in claim 4, wherein said source emits infrared light.

6. Apparatus as defined in claim 4, wherein said webs include at least one strip which is not sensitive to light and whose reflectivity is less pronounced than that of a photosensitive web so that the reflection of said light beam by said strip does not result in the transmission of a second signal.

7. Apparatus as defined in claim 3, wherein said moving means includes means for continuously moving said detector back and forth transversely of said paths at a constant speed between first and second end positions, each cycle of said detector including a movement from one of said end positions to the other of said end positions and back to said one end position.

8. Apparatus as defined in claim 3, wherein said control means includes first input means for said first signals, second input means for said second signals, and means for operating said feeding means to effect the admission of a predetermined quantity of replenishment chemicals to said bath whenever said first input means receives a first signal while said second input means receives a second signal.

9. A method of feeding replenishment chemicals to a liquid bath in a photographic processor wherein webs of identical or different widths are transported lengthwise ahead of, through and beyond the bath along separate paths at a variable speed and such webs include at least one photosensitive web, comprising a first step of generating first signals at a frequency corresponding to the rate of transport of successive unit lengths of the webs through said bath; a second step of generating at regular intervals second signals whose number is identical with the number of photosensitive webs and each of which persists for a period of time proportional to the width of the monitored photosensitive web, said second step including moving a detector cyclically transversely of all of said parhs; and a third step of feeding replenishment chemicals to said bath in response to each generation of a first signal during the persistence of a second signal.

10. A method as defined in claim 9, wherein said webs include at least one additional web whose light-reflectivity differs from light-reflectivity of said photosensitive web.

11. Apparatus for feeding replenishment chemicals to a liquid bath in a photographic processor wherein webs of identical or different widths are transported through the bath lengthwise at a variable speed and such webs include at least one photosensitive web, comprising means for transporting the webs through said bath along discrete paths; means for monitoring the velocity of the web in one of said paths, including means for generating first signals at a frequency corresponding to the rate of transport of successive unit lengths of the web in said one path through said bath and a device for storing a portion of a web in one of said paths ahead of said bath, said device including means for changing the length of said stored portion at a frequency which varies with the speed of said webs and said means for generating said first signals including a detector arranged to transmit first signals at said last mentioned frequency; means for monitoring all of said paths, including means for generating at regular intervals second signals, one for each photosensitive web and each persisting for a period of time which is proportional to the width of the monitored photosensitive web; means for intermittently feeding replenishment chemicals to said bath; and control means for actuating said feeding means in response to each generation of a first signal during the persistence of a second signal.

12. Apparatus as defined in claim 11, wherein said portion of said last mentioned web forms a loop and said means for changing the length of said loop includes a dancer roll in the bight of said loop, said detector being adjacent the path of movement of and being actuated by said dancer roll.

13. Apparatus for feeding replenishment chemicals to a liquid bath in a photographic processor wherein webs of identical or different widths are transported through the bath lengthwise at a variable speed and such webs include at least one photosensitive web, comprising means for transporting the webs through said bath along discrete paths; means for monitoring the velocity of the web in one of said paths, including means for generating first signals at a frequency corresponding to the rate of transport of successive unit lengths of the web in said one path through said bath, said means for generating said first signals including a first electric switch and said monitoring means further comprising a device for closing said switch upon completion of transport of each successive unit length of the web past a predetermined portion of said one path; means for monitoring all of said paths, including means for generating at regular intervals second signals, one for each photosensitive web and each persisting for a period of time which is proportional to the width of the monitored photosensitive web; means for intermittently feeding replenishment chemicals to said bath; and control means for actuating said feeding means in response to each generation of a first signal during the persistence of a second signal, said control means including a second electric switch and means for closing said second switch whenever and as long as the respective signal generating means generates a second signal and means for operating said feeding means to admit a predetermined quantity of chemicals to said bath in response to simultaneous closing of said switches.

14. Apparatus as defined in claim 13, wherein said switches are connected in series.

15. Apparatus for feeding replenishment chemicals to a liquid bath in a photographic processor wherein webs of identical or different widths are transported through the bath lengthwise at a variable speed and such webs include at least one photosensitive web, comprising means for transporting the webs through said bath along discrete paths; means for monitoring the velocity of the web in one of said paths, including means for generating first signals at a frequency corresponding to the rate of transport of successive unit lengths of the web in said one path through said bath; means for monitoring all of said paths, including means for generating at regular intervals second signals, one for each photosensitive web and each persisting for a period of time which is proportional to the width of the monitored photosensitive web, said means for generating said second signals comprising a detector and said means for monitoring all of said paths further comprising means for moving said detector cyclically transversely of said paths, each cycle taking up a first interval of time and each first interval including at least one second interval of movement of said detector between two neighboring paths, the length of each of said first and second intervals being other than a whole multiple of the length of an interval between the generation of two successive first signals; means for intermittently feeding replenishment chemicals to said bath; and control means for actuating said feeding means in response to each generation of a first signal during the persistence of a second signal.

* * * * *